United States Patent
Davtchev et al.

(10) Patent No.: US 8,229,732 B2
(45) Date of Patent: Jul. 24, 2012

(54) AUTOMATIC CORRECTION OF USER INPUT BASED ON DICTIONARY

(75) Inventors: Ivan D. Davtchev, San Francisco, CA (US); Noah Coccaro, Mountain View, CA (US); Adi Avidor, Bat-Yam (IL); Nir Andelman, Tel-Aviv (IL); Mario Tanev, San Francisco, CA (US)

(73) Assignee: Google Inc., Mountain View, CA (US)

( * ) Notice: Subject to any disclaimer, the term of this patent is extended or adjusted under 35 U.S.C. 154(b) by 901 days.

(21) Appl. No.: 12/201,895

(22) Filed: Aug. 29, 2008

(65) Prior Publication Data

US 2009/0083028 A1    Mar. 26, 2009

Related U.S. Application Data

(60) Provisional application No. 60/969,458, filed on Aug. 31, 2007.

(51) Int. Cl.
*G06F 17/20* (2006.01)
*G06F 17/28* (2006.01)
*G10L 21/00* (2006.01)

(52) U.S. Cl. ........... 704/8; 704/5; 704/277; 715/264

(58) Field of Classification Search .............. None
See application file for complete search history.

(56) References Cited

U.S. PATENT DOCUMENTS

| | | | |
|---|---|---|---|
| 5,535,119 A | 7/1996 | Ito et al. | |
| 6,065,003 A | 5/2000 | Sedluk | |
| 6,272,456 B1 * | 8/2001 | de Campos | 704/8 |
| 6,292,772 B1 * | 9/2001 | Kantrowitz | 704/9 |
| 6,326,953 B1 * | 12/2001 | Wana | 345/168 |
| 7,113,904 B2 * | 9/2006 | Litster et al. | 704/8 |
| 7,310,605 B2 | 12/2007 | Janakiraman et al. | |
| 7,562,007 B2 * | 7/2009 | Hwang | 704/8 |
| 7,590,626 B2 * | 9/2009 | Li et al. | 707/708 |
| 7,797,152 B1 | 9/2010 | Waite et al. | |
| 7,813,920 B2 * | 10/2010 | Leung et al. | 704/10 |
| 2002/0047831 A1 * | 4/2002 | Kim et al. | 345/168 |
| 2004/0093333 A1 | 5/2004 | Suzuki et al. | |
| 2004/0260536 A1 | 12/2004 | Hwang et al. | |
| 2005/0071332 A1 | 3/2005 | Ortega et al. | |
| 2005/0119875 A1 | 6/2005 | Shaefer et al. | |
| 2005/0182616 A1 | 8/2005 | Kotipalli | |

(Continued)

FOREIGN PATENT DOCUMENTS

EP    0967555 A2    12/1999

(Continued)

OTHER PUBLICATIONS

European Examiner Justin Woods, International Report on Patentability for Application No. PCT/US2008/074889, dated Mar. 11, 2010, 9 pages.

International Preliminary Report on Patentability from International Application No. PCT/US2007/087582 mailed Jun. 25, 2009, 17 pages.

(Continued)

*Primary Examiner* — Brian Albertalli
(74) *Attorney, Agent, or Firm* — Fish & Richardson P.C.

(57) ABSTRACT

Methods, systems, and apparatus, including computer program products, in which input keystroke data can be interpreted by a current mapping and a determination can be made whether the current mapping is valid based upon the characters identified by the mapping and the keystroke data. Invalid mappings can be corrected based upon alternative mapping of the keystroke data.

23 Claims, 7 Drawing Sheets

U.S. PATENT DOCUMENTS

| | | |
|---|---|---|
| 2005/0195171 A1* | 9/2005 | Aoki et al. .................... 345/172 |
| 2005/0216253 A1 | 9/2005 | Brockett |
| 2007/0011132 A1 | 1/2007 | Zhou et al. |
| 2007/0055493 A1 | 3/2007 | Lee |
| 2007/0189613 A1 | 8/2007 | Tanaka |
| 2007/0213983 A1 | 9/2007 | Ramsey |
| 2008/0155399 A1 | 6/2008 | Kock |
| 2009/0222445 A1* | 9/2009 | Tavor ................................ 707/6 |

FOREIGN PATENT DOCUMENTS

| | | |
|---|---|---|
| EP | 1577793 A2 | 9/2005 |
| KR | 10-1997-0007686 A | 2/1997 |
| KR | 2001-0064751 | 12/1999 |
| KR | 10-2001-0064751 A | 7/2001 |
| KR | 10-2006-0118253 A | 11/2006 |

OTHER PUBLICATIONS

International Search Report and Written Opinion for PCT application No. PCT/US2007/087582, dated May 15, 2008, 21 pages.

International Search Report and Written Opinion from International Application No. PCT/US2008/074889 mailed Jan. 19, 2009, 18 pages.

Office Action dated Apr. 19, 2011 from Chinese Application No. 200710101817.8, 15 pages. (with English translation).

Brill et al, "Automatically Harvesting Katakana-English Term Pairs from Search Engine Query Logs", 2001, In Proc. of NLPPRS, pp. 1-7.

Bilac et al, "Extracting transliteration pairs from comparable corpora", 2005, In Proceedings of the Annual Meeting of the Natural Language Processing Society, Japan, pp. 1-4.

* cited by examiner

AUTOMATIC CORRECTION OF USER INPUT BASED ON DICTIONARY

CROSS-REFERENCE TO RELATED APPLICATIONS

This Application claims priority under 35 U.S.C. §119(e) to U.S. Provisional Application Ser. No. 60/969,458, filed on Aug. 31, 2007, the disclosure of which is incorporated herein by reference.

BACKGROUND

This disclosure relates to automatically changing characters associated with a current keyboard layout to characters of another keyboard layout.

A search engine can allow a user to provide a search query for which search results are returned in response. The query can include any character that the user is capable of generating with his or her input device. Input devices can have keys or buttons that are each capable of producing one of many characters. A keyboard, for example, can have multiple keyboard layouts. Each keyboard layout typically corresponds to the characters most frequency used within a particular writing system (e.g., a language). In countries whose writing systems are not based on the Latin alphabet, keyboards usually have at least two keyboard layouts, one for producing Latin characters (e.g., a US English keyboard layout), and another for producing characters of another writing system (e.g., Cyrillic, Devanagarī, Arabic, etc.).

Users can switch between two or more keyboard layouts by invoking switching command (e.g., using a single keystroke). The currently selected keyboard layout normally determines the characters produced by each key of the keyboard. A user may inadvertently use their input device to input keystrokes in one layout when they intended to input the keystrokes in another layout. For example, a user searching for "news" may inadvertently submit "ד'קמ" if the currently keyboard layout is a Hebrew keyboard layout, as the keystrokes that produce the characters "ד'קמ" in the Hebrew keyboard layout also produce the characters "news" on the corresponding Latin keyboard layout.

SUMMARY

Apparatus, systems and methods related to the correction of input data are disclosed herein. In some implementations, a method can includes receiving keystroke data from a keyboard device; determining a current keyboard mapping for the keyboard device and that is associated with a language; determining current characters based on the keystroke data and the current keyboard mapping; comparing the current characters to a dictionary storing words, each of the words comprising a word in the language; determining if the current keyboard mapping is valid based on the comparison; if the current keyboard mapping is determined to be valid, then accepting the characters as input; if the current keyboard mapping is determined not to be valid, then: selecting an alternative keyboard mapping associated with an alternative language; determining alternative characters based on the keystroke data and the alternative keyboard mapping; comparing the alternative characters to an alternative dictionary storing words, each of the words comprising a word in the alternative language; and, determining if the alternative keyboard mapping is valid based on the comparison. Other embodiments of this aspect include corresponding systems, apparatus, and computer program products.

Other methods include: receiving keystroke data for a keyboard input device; determining a current keyboard mapping for the keyboard device and that is associated with a language; determining characters based on the keystroke data and the current keyboard mapping; comparing the characters to words in the language; determining whether the characters identify a word in the language based upon the comparison; if the characters are determined to not identify a word in the language: selecting an alternative keyboard mapping associated with an alternative language; determining alternative characters based on the keystroke data and the alternative keyboard mapping; comparing the alternative characters to alternative words in the alternative language; and identifying one or more alternative words based on the comparison. Other embodiments of this aspect include corresponding systems, apparatus, and computer program products.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

In various implementations of this disclosure, the systems of this disclosure can operate to correct an input based upon a determination that the input does not correspond to a dictionary entry. In some implementations, the correction can be based on the selection of a most likely intended keyboard mapping. For example, if a user enters "ד'קמ" and such a word does not appear in a Hebrew dictionary, it is likely that the user intended to enter another word. In this example, the letters corresponding to "ד'קמ" generate from a current Hebrew language keyboard mapping may not closely correspond to any other word in the Hebrew language, but corresponds to the letters n-e-w-s on a Latin/English language mapping of the keyboard. Thus, it is likely that the user intended to enter "news" rather than "ד'קמ"

In some implementations, the correction can be based on transliteration. For example, the user might attempt to phonetically spell a word using a more familiar language. The phonetic spelling, however, may not correspond to a word in the language associated with the current keyboard mapping. For example, a user's first language might be English. However, the user might also speak another language (e.g., Hebrew or Russian), even though the user might not be proficient at writing in the other language. In such instances, the user can enter the word phonetically and rely on a transliteration to provide the correct input.

Figure 1:
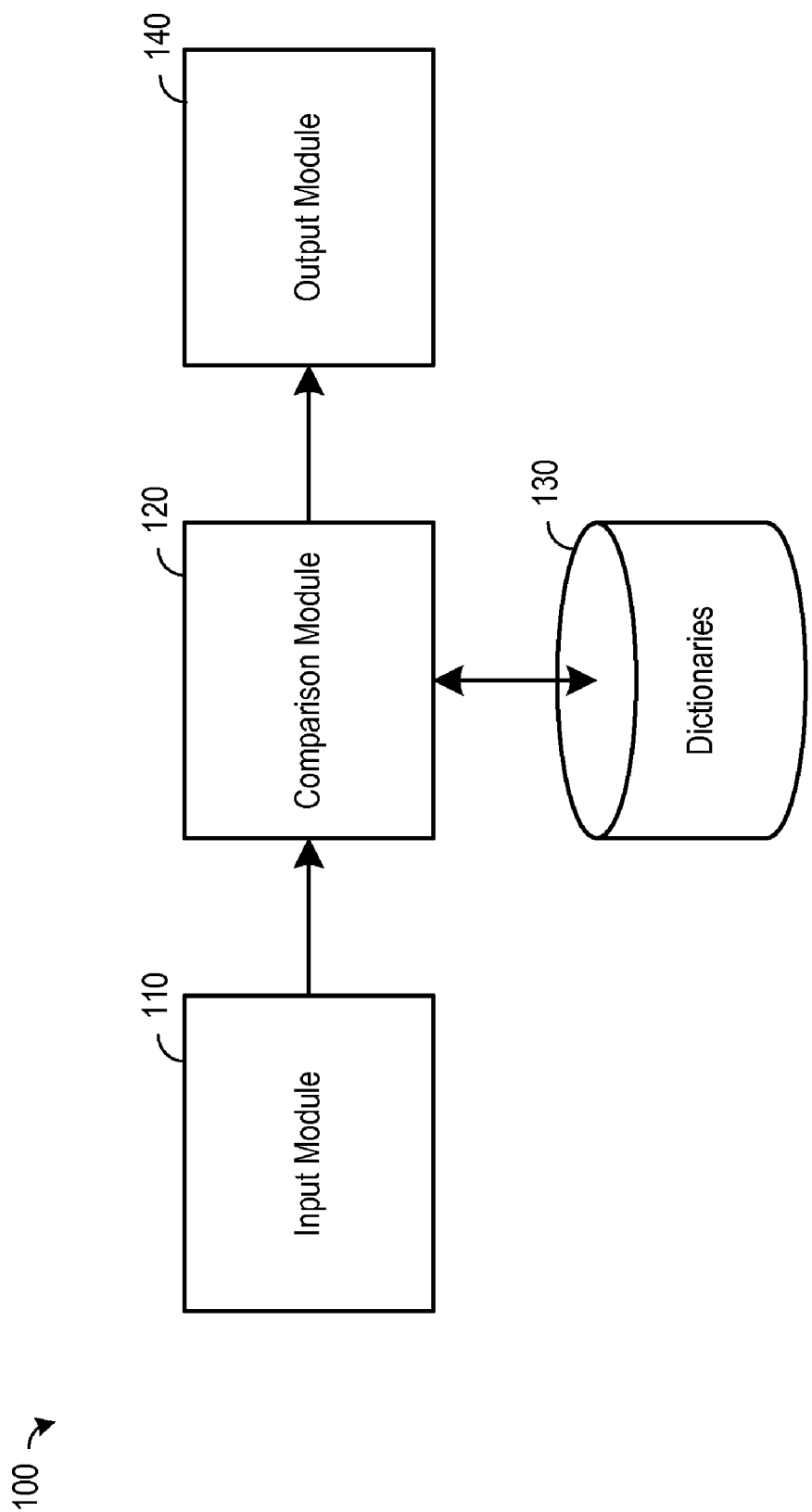
FIG. 1 is a block diagram illustrating an example input correction system.

FIG. 1 is a block diagram illustrating an example input correction system 100. Input can be received for example, using an input module 110. The input module, in various implementations, does not include a keyboard input device, e.g., the system 100 can be implemented in a web server and receive data from a client device over the Internet. In other implementations, the input module can include a keyboard input device, e.g., the system can be implemented in a client computer, a mobile communication device, or some other computing device that includes a keyboard device.

The input module 110 is operable to receive keystroke data for a keyboard input device, and interpret the input data based upon a current mapping associated with the keyboard input device. For example, if the user is operating the keyboard input device in a Latin/English language mode, the keyboard can be set up in the standard "QWERTY" layout. In other examples, the keyboard input device can be set up in other layouts. As such, each key can map to a different input character based upon the current mapping of the keyboard input device. The input module can receive the keyboard data and can interpret the keyboard data to produce character data based upon the current mapping of the keyboard input device.

A comparison module 120 can be used to compare the character data to a plurality of words in a plurality of dictionaries 130. In various implementations, the comparison module 120 can determine whether the characters entered by the user correspond to a word in the language implicated by the keyboard input device, or by an input method editor (IME). For example, the comparison module 120 can examine the input "news" and based upon determining that the current dictionary identified by the current mapping includes a corresponding word, the input can be accepted. In another example, if the user enters a series of characters that do not appear in a current dictionary associated with the current language identified by the current mapping, the comparison module 120 can attempt to identify an alternative candidate word.

In various implementations, alternative candidate words can be identified by deriving alternative characters associated with the keyboard input based upon different mappings of the keyboard. For example, a user might enter keystroke data corresponding to the characters "hartk" when the keyboard input device is in a Latin/English layout. However, the same keystroke data corresponds to "ישראל" (meaning "Israel" in Hebrew) when the input device is in a Hebrew layout. Because the word "לארשי" appears in a Hebrew dictionary, the comparison module can determine that it is likely that when the user entered keystrokes corresponding to "hartk" in English, that the user intended to input the word "לארשי" in Hebrew instead.

In some examples, the words may not provide exact matches in any of a number of dictionaries. In some implementations, the comparison module can account for such examples by deriving a relevancy associated with alternative candidate words based upon a degree to which the characters in the various languages match words in the various languages. For example, a first word might match six out of seven of the characters in one language, a second word might match five out of seven of the characters in another language, and a third word might match five out of seven of the characters in a third language. In such an example, in accordance with ranking based on relevance, the first word would be listed first, followed by the second and third words. In other implementations, only the most relevant word might be provided to the user.

In another implementation, alternative candidate words can be ranked based upon the frequency with which the alternative candidate words are used. In some such implementations, the frequency can be the frequency with which a word is used by the user entering the keystroke data, or the frequency with which a word is used based on a language model.

The output module 140 can provide an alternative candidate word to a user associated with the keystroke data. In some implementations, the output module 140 can automatically correct the input based upon the alternative candidate word(s) received from the comparison module 120. For example, when a user types "hartk", the output module can automatically correct the input to "לארשי" In additional implementations, the output module can also instruct the input module to change the current mapping based upon correcting the input from the user.

In other implementations, the output module 140 can suggest changes to the user. For example, if the user enters "hartk", the output module 140 can provide a pop-up window to the user suggesting that the input be changed to "לארשי". In further implementations, the output module can also suggest to the user to change the current mapping of the keyboard input to match the language associated with the suggested correction.

Figure 2:
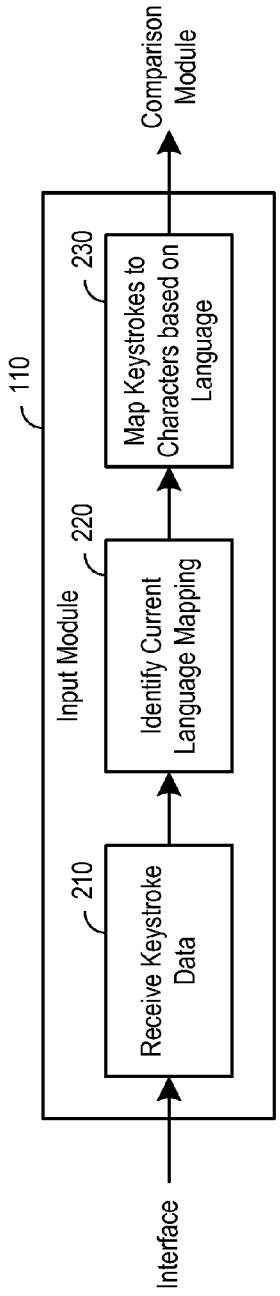
FIG. 2 is a block diagram illustrating an example of the input module of FIG. 1.

FIG. 2 is a block diagram illustrating an example of the input module 1110 of FIG. 1. The input module 110 can receive input from an interface device (e.g., a keyboard) at stage 210. In various implementations, the input can include keystroke data received from a keyboard.

At stage 220, the input module 110 can identify a current language mapping associated with the keystroke data. In various implementations, the current language mapping can be identified by an input method editor, or by a system preference setting, or by some other configuration device or configuration data. For example, if a keyboard mapping is set to Hebrew, and the user selects a key corresponding to the "n" key on a Latin/English layout, the character "ד" might be interpreted by the input module 110. In other implementations, the current language mapping can be identified by the keyboard device.

At stage 230 the received keystrokes are mapped to characters based upon the current language mapping identified by stage 220. In various implementations, the keystroke data can be interpreted as each keystroke is entered. In other implementations, such as where several keystrokes might identify a single character, the keystrokes can be interpreted in combination. The input module 110 can output the characters to a comparison module (e.g., comparison module 120 of FIG. 1).

Figure 3:
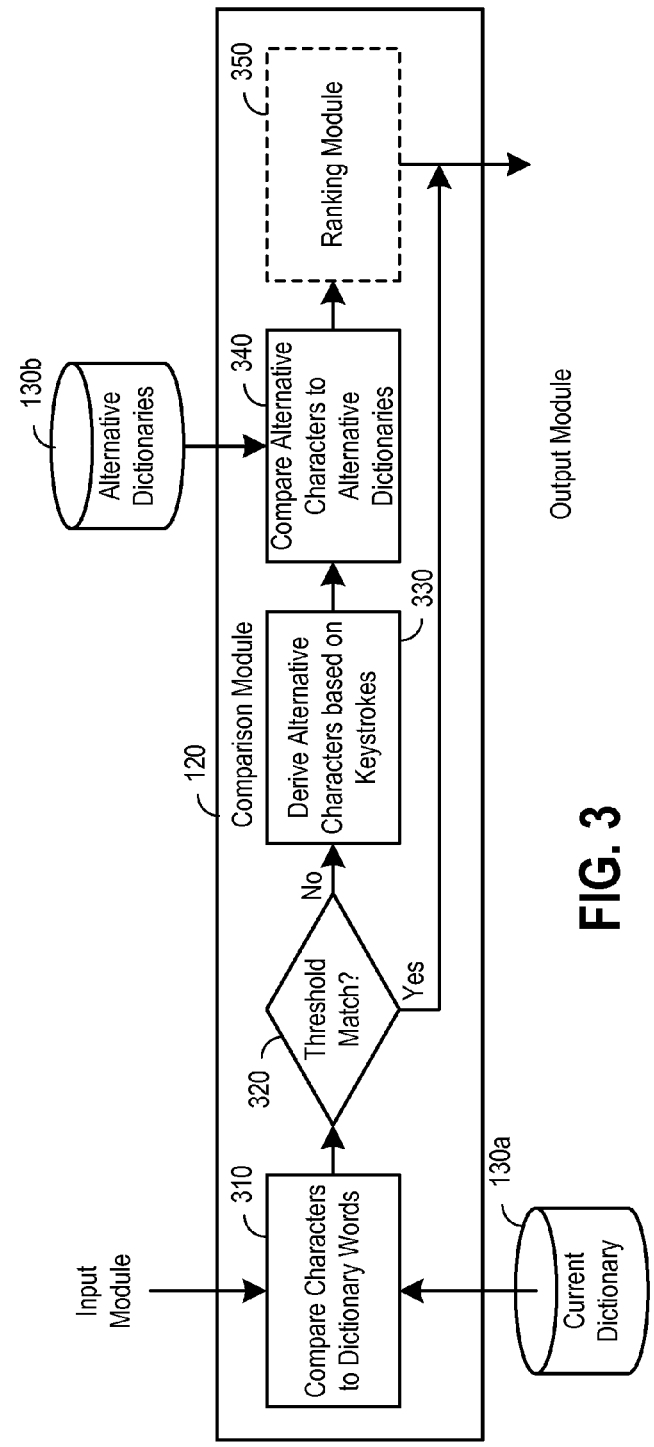
FIG. 3 is a block diagram illustrating an example of the comparison module of FIG. 1.

FIG. 3 is a block diagram illustrating an example of the comparison module 120 of FIG. 1. The comparison module 120 can receive character data from an input module (e.g., input module 110 of FIG. 1). At stage 310, the comparison module can compare the characters received from the input module to entries in a dictionary 130a (e.g., recognized words). In various implementations, the dictionary 130a can be provided by a third party service. In other implementations, the dictionary 130a can be a learned dictionary, e.g., of search queries or previously entered words. In further implementations, the dictionary 130a can be a combination of words from a standard dictionary or third party dictionary service and words learned through use of the system.

In various implementations, the comparison module can derive a degree to which the characters match a word from the dictionary (e.g., relevance). In such implementations, the degree to which the characters match a word from the dictionary corresponds can be compared to a threshold degree, as shown at stage 320. If the characters match a word to a threshold degree, the characters can be accepted as input and forwarded to the output module. In other implementations, the characters can be accepted as input, and a spelling correction can be suggested. In still further implementations, the characters can be accepted as input, and an alternative candidate word can be suggested.

At stage 330, alternative characters can be derived based upon an alternative mapping of the keystroke data. In various implementations, the comparison module can use any available alternative mapping to derive alternative characters. In some implementations, the available alternative mappings can include only those alternative mappings which have previously been used by the user. Thus, for example, the comparison module might not convert the keystroke data to characters in Afrikaans if the user has never previously used the input module to enter words in Afrikaans.

In various implementations, the potential dictionaries can also be identified based upon a location of the computer associated with the user. For example, the internet protocol (IP) address might be associated with a particular geographic location. In other examples, a preferences in a web browser can be used to determine alternative dictionaries. In still further examples, cookies, operating system settings, as well as other preferences could be examined to determine which alternative dictionaries can be used.

At stage 340, the alternative characters can be compared to words from an alternative language. The words from the alternative language can be provided by an alternative language dictionary 130b. In some implementations, the alternative language dictionary can be provided, for example by a third party service. In other implementations, the alternative language dictionary 130b can be a learned dictionary that compiles previously used words entered using various language modes. In still further implementations, the alternative language dictionary 130b can be a combination of standard dictionaries or third party dictionaries and learned dictionaries populated through previous usage of the input module. In other implementations, the dictionary can be a learned dictionary. A learned dictionary can be derived by examining all of the documents on the internet (e.g., from an index of the words on the internet) and/or search queries received. In some implementations, words that appear in an index and/or in search queries can be eliminated based upon statistical models that indicate that the word is likely to be a misspelling based upon the marginal use observed in network activity.

In various implementations, the alternative words may only provide partial matches to the characters corresponding to the keystroke data in the various keyboard mappings. In such implementations, the comparison module 120 can include a ranking module 350 operable to rank the words and/or alternative candidate words based upon their relevance (e.g., percent match) to the characters and/or alternative characters. In other such implementations, the ranking module 350 can be operable to rank the words and/or alternative candidate words based upon the frequency with which the word and/or alternative candidate word is used. For example, if the keystroke data corresponds to, e.g., either matches or has many characters in common with, a frequently used word in a first language, and also corresponds to a rarely used word in a second language, the comparison module 120 can rank the frequently used word at a first position and the rarely used word at a second position. In various implementations, the frequency associated with a word use can be derived based upon the particular user entering the keystroke data or can be based upon a language model associated with the respective language of the word or alternative candidate word. The comparison module 120 can output the result to an output module (e.g., output module 140 of FIG. 1).

Figure 4:
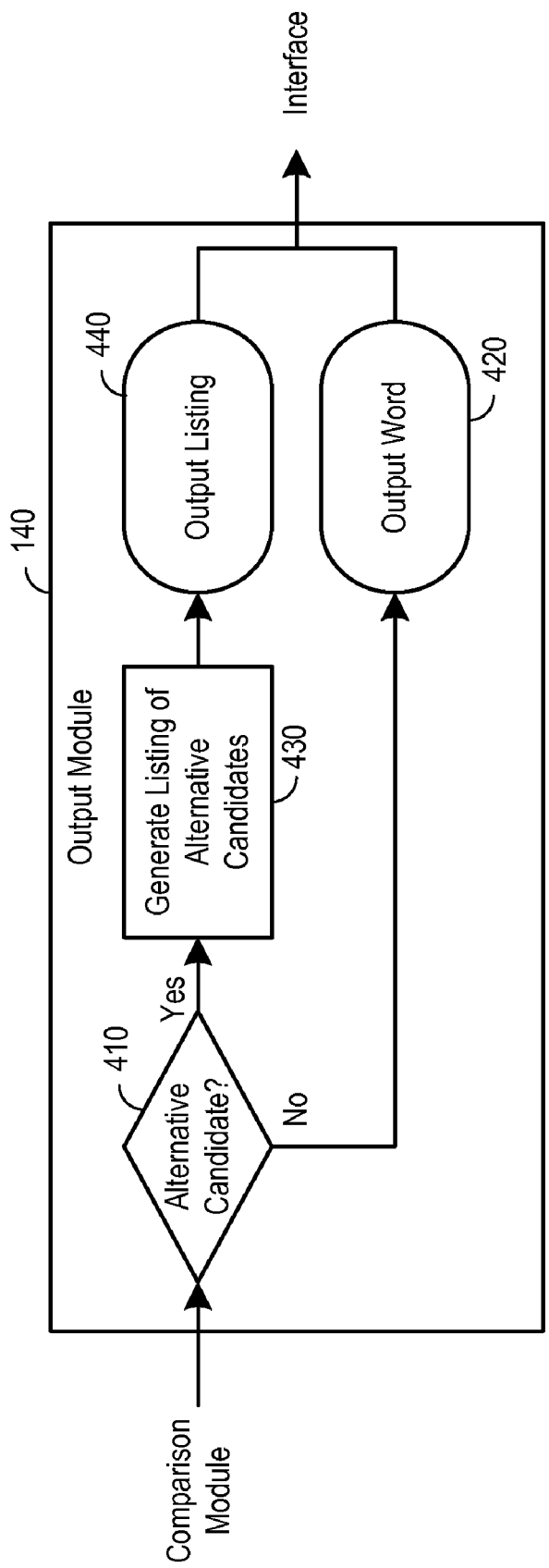
FIG. 4 is a block diagram illustrating an example of the output module of FIG. 1.

FIG. 4 is a block diagram illustrating an example of the output module 140 of FIG. 1. At stage 410, the output module can receive a result of a comparison module (e.g., comparison module 120 of FIG. 1) and determine whether the result includes an alternative candidate word. In those examples, where the result does not include an alternative candidate word, the output module 140 merely outputs the word derived from the keystroke data received from a user through an interface at stage 420.

If the results of the comparison module 120 include an alternative candidate word, the output module 140 generates a listing of the alternative candidate words at stage 430. In various implementations, the listing of the alternative candidate words can be ordered based upon a ranking received from the comparison module. For example, the alternative candidate words can be listed in order of relevance or frequency of use, among others.

At stage 440, the listing of alternative candidate words is output to the user through an interface. In various implementations, the listing of the alternative candidate words can be output to the user in the form of a pop-up providing suggestions to the user. In other implementations, a most probable alternative candidate word can be output to the user by replacing the characters identified by the keystroke data and the current keyboard mapping.

Figure 5:
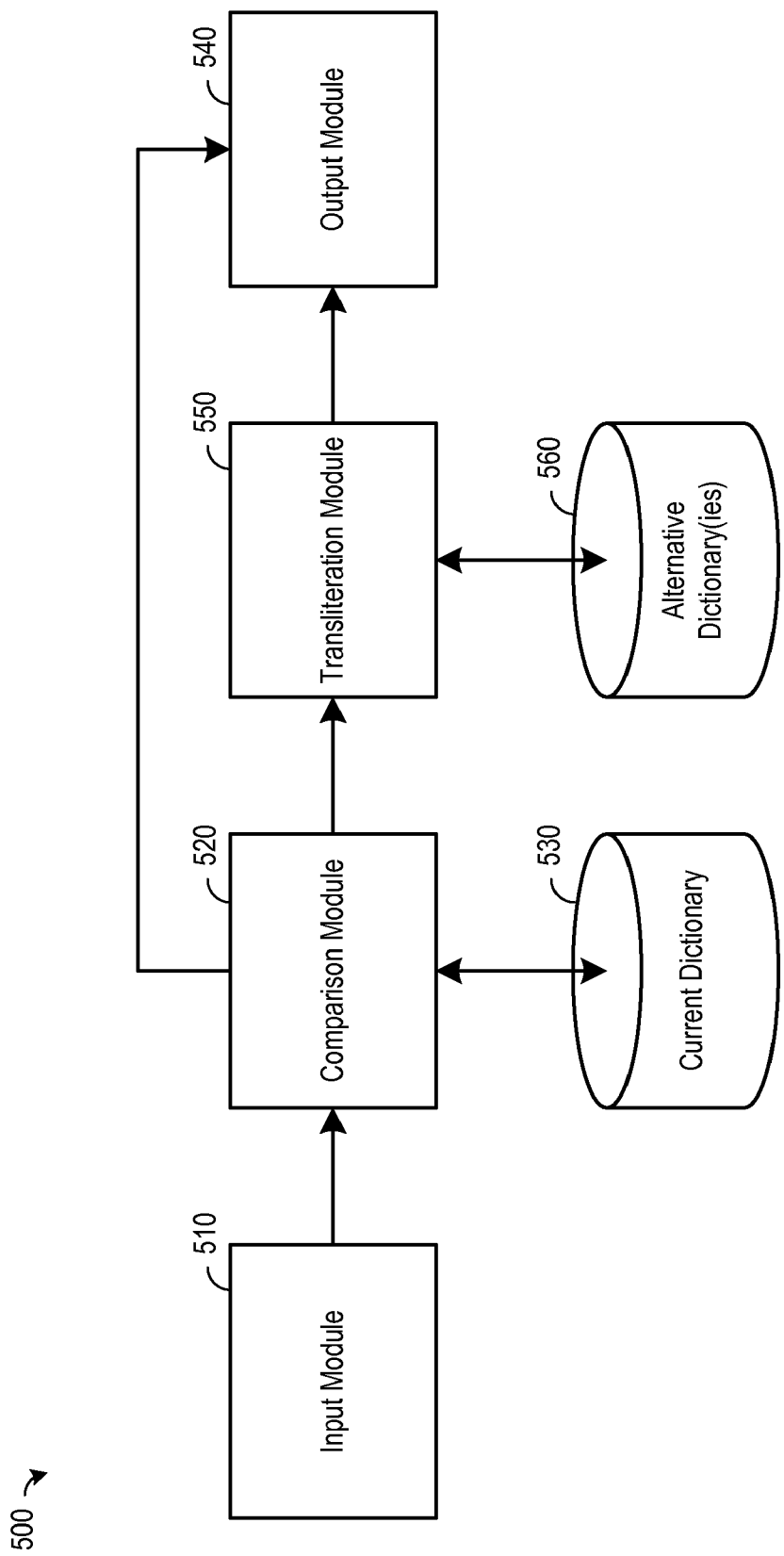
FIG. 5 is a block diagram illustrating another example input correction system.

FIG. 5 is a block diagram illustrating another example input correction system 500. Input can be received for example, using an input module 510. The input module 510, in various implementations, does not include a keyboard input device, e.g., the system 100 can be implemented in a web server and receive data from a client device over the Internet. In other implementations, the input module 510 can include a keyboard input device, e.g., the system can be implemented in a client computer, a mobile communication device, or some other computing device that includes a keyboard device. The input module 510 is operable to receive keystroke data for a keyboard input device, and interpret the input data based upon a current mapping associated with the keyboard input device. The input module 510 can determine the characters associated with the keystroke data based upon the current mapping associated with the keyboard device.

A comparison module 520 can be used to compare the character data to a plurality of words in a current dictionary 530 associated with the current keyboard mapping. In various implementations, the comparison module 520 can determine whether the characters entered by the user correspond to a word in the language defined by the current keyboard mapping and based upon the presence of the character string in the current dictionary. For example, the comparison module 520 can examine the input "news" and based upon determining that the current dictionary 530 identified by the current mapping includes a corresponding word, the input can be accepted. In such examples, the comparison module 520 can accept the input and instruct an output module 540 to provide the output. In another example, if the user enters a series of characters that do not appear in the current dictionary 530 associated with the current language identified by the current mapping, the comparison module 520 can determine that the characters were not intended to be entered using the current mapping.

In some implementations, the user might attempt to phonetically spell a word using a more familiar language. For example, a user's first language might be English. However, the user might also speak another language (e.g., Chinese, Hebrew or Russian), even though the user might not be proficient at writing in the other language. As such, the user might desire to provide input in the other language but be unable to spell the word properly. In other examples, users may just not want to change input methods, and instead keep an input method editor in the current mode and provide a phonetic version (e.g., transliteration) of the foreign language word. In such instances, the user can provide a transliteration and rely on a transliteration module 550 to provide the correct input.

The transliteration module 550 can derive a transliteration associated with the keystrokes and based upon the current mapping of a keyboard input device. For example, if a user desires to enter "Jerusalem" in Hebrew, the user might enter "Yerushalaim" (or "Yerrushallim"). The transliteration module 550 can identify the transliteration entered in the current mapping, and compare the transliteration to an alternative dictionary 560 (or dictionaries) to derive an alternative candidate word associated with the transliteration. In the example above, the user could enter "Yerushalaim" and the transliteration module 550 can provide an alternative candidate word, e.g., the native spelling of Jerusalem (e.g., "ימילשורי").

In various implementations, the transliteration module 550 can include a fixed mapping of characters or groups of characters from one language to another. For example, a character or group of characters in one language can be translated to the same character in the foreign language based upon the fixed transliteration mapping. The converted transliteration can then be compared to words in a foreign language dictionary to determine the likelihood that the conversion of the transliteration to the foreign language characters is correct.

However, in other implementations, the transliteration module 550 can include the intelligence to learn new transliterations from usages that the transliteration module observes in documents and queries received from a network (e.g., the Internet). In various examples, transliterations can change over time as language evolves. Therefore, a fixed mapping of transliterations might become inaccurate over time. Moreover, transliterations are informal mechanisms for language with no formal or defined rules. The popularity of various transliterations can rise or fall over time without any formal announcement of such. Thus, in such implementations, the transliteration module 550 can derive a current transliteration mapping by observing usage by users in myriad seed documents to determine which characters or groups of characters map to a given foreign language. The transliteration module 550 can further observe keywords entered by users and/or web documents in the specific languages whose transliteration patterns are to be implemented and adapt the transliteration mappings to account for new usages based upon connections that the transliteration module 550 discovers users implementing.

The output module 540 can provide an alternative candidate word to a user associated with the keystroke data. In some implementations, the output module 140 can automatically correct the input based upon the alternative candidate word(s) received from the comparison module 540. For example, when a user types "Yerushalaim", the output module can automatically correct the input to "ימילשורי". In additional implementations, the output module 540 can also instruct the input module 510 to change the current mapping based upon correcting the input from the user. In other implementations, the output module 540 can suggest changes to the user. For example, if the user enters "Yerushalaim", the output module 540 can provide a pop-up window to the user suggesting: "Did you mean: ימילשורי?".

Figure 6:
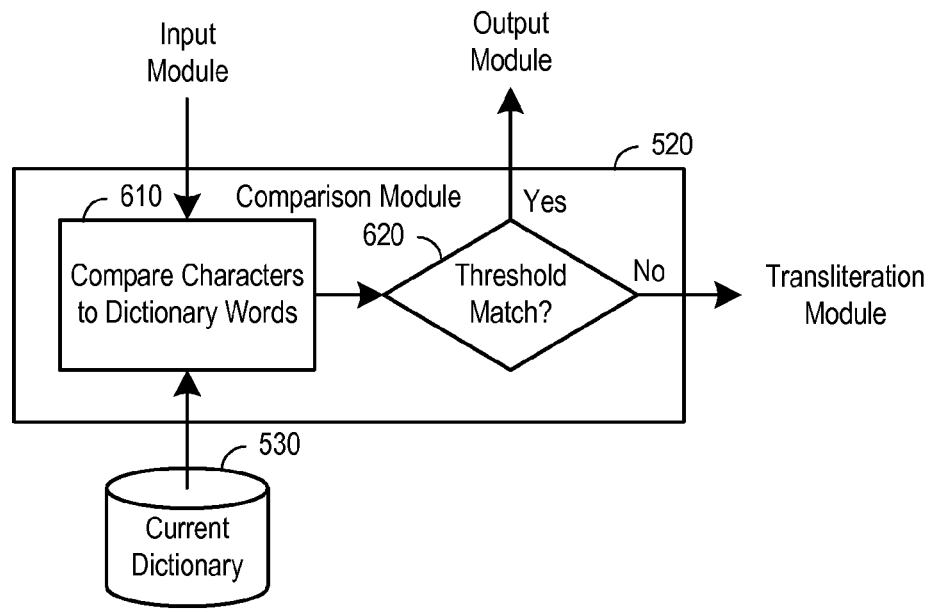
FIG. 6 is a block diagram illustrating an example of the comparison module of FIG. 5.

FIG. 6 is a block diagram illustrating an example of the comparison module 520 of FIG. 5. The comparison module 520 can receive character data from an input module (e.g., input module 510 of FIG. 5). At stage 610, the comparison module 520 can compare the character data to dictionary data to determine whether the character data matches a word associated with the current dictionary 530. The current dictionary 530 can include many words in the language of the current keyboard mapping. In various implementations, the dictionary can be provided by a third party service. In other implementations, the dictionary can be compiled based upon user input. In still further implementations, the dictionary can be based upon a language model, and can be supplemented by use of an input module.

At stage 620, the comparison module 520 determines whether there is a threshold match between the characters and any words found in the current dictionary 530. If there is a threshold match, the comparison module accepts the input and instructs an output module (e.g., output module 540 of FIG. 5) to provide the output to the user. If there is no threshold match between the characters and any words found in the current dictionary 530, the comparison module communicates the characters to a transliteration module (e.g., transliteration module 550 of FIG. 5). In various implementations the threshold match can define a degree to which the characters correspond to a word to be considered a match. In other examples, thresholds can be used to determine whether the alternative characters are considered a match for an alternative word, or a transliteration is considered a match a alternative word. For example, "neww" can be considered a threshold match for "news." In various implementations, the threshold to determine a match can be adjusted based upon user input.

Figure 7:
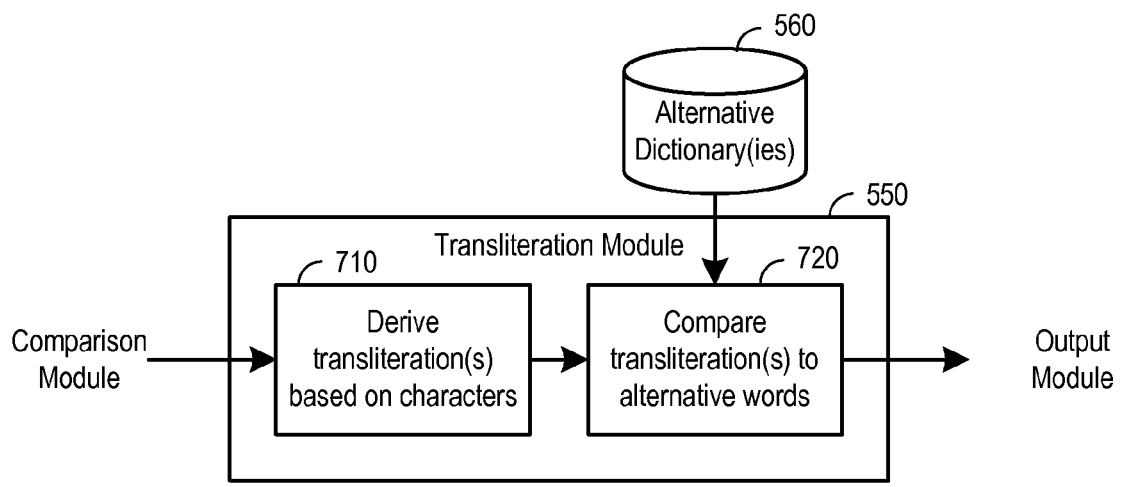
FIG. 7 is a block diagram illustrating an example of the transliteration module of FIG. 5.

FIG. 7 is a block diagram illustrating an example of the transliteration module 550 of FIG. 5. The transliteration module 550 can receive character data from a comparison module (e.g., comparison module 520 of FIG. 5). At stage 710, the transliteration module 550 can derive transliterated characters associated with the keystrokes and based upon the current mapping and the language of the current mapping. For example, if a user desires to enter "Jerusalem" in Hebrew, the user might enter "Yerushalaim" (or "Yerrushallim").

After the transliteration module 550 identifies the transliterated characters entered in the current mapping, it can compare the transliterated characters to an alternative dictionary 560 (or dictionaries) to derive an alternative candidate word associated with the transliterated input as shown at stage 720. In the example above, the user could enter "Yerushalaim" and the transliteration module 550 can provide an alternative candidate word, e.g., the native spelling of Jerusalem (e.g., "ימילשורי").

Figure 8:
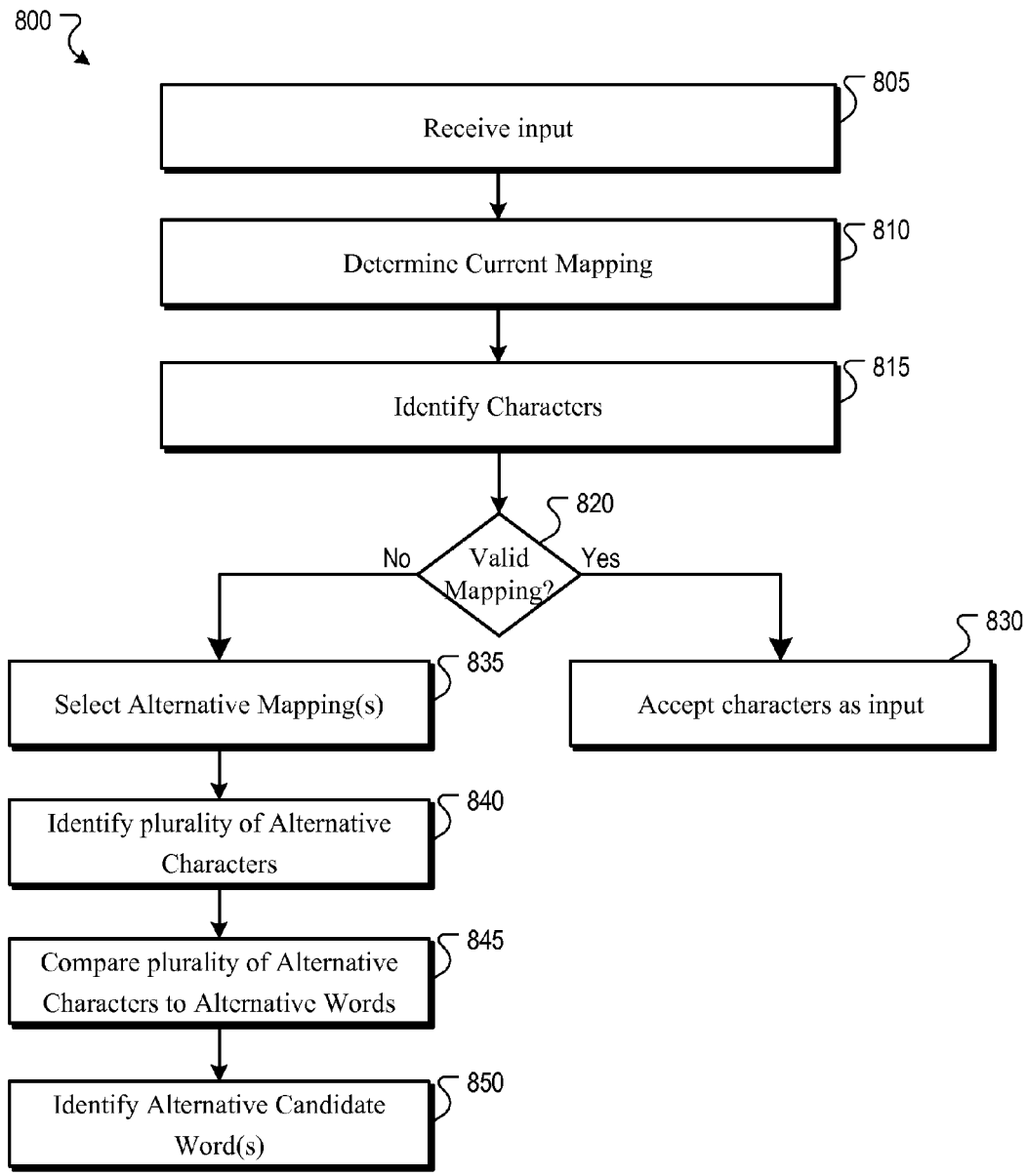
FIG. 8 is a flowchart illustrating an example method of correcting an input.

FIG. 8 is a flowchart illustrating an example method 800 of correcting an input. At stage 805, input can be received. The input can be received, for example, by an input module (e.g., input module 110 of FIG. 1). In various implementations, the input can be received from an input device such as a keyboard.

At stage 810, a current mapping is determined. The current mapping can be determined, for example, by an input module (e.g., input module 110 of FIG. 1). In various implementations, the current mapping can be identified, for example, by an input method editor (IME) or an operating system, or the keyboard itself. In various implementations, the current mapping can take a particular keystroke and map that keystroke to a particular character (e.g., in accordance with a Unicode standard).

At stage 815, characters are identified. The characters can be identified, for example, by an input module (e.g., input module 110 of FIG. 1). In various implementations, the characters can be identified by mapping received input (e.g., keystroke data) to a character based upon the current mapping.

At stage 820, a determination made whether the current mapping is valid. The determination of whether a current mapping is valid can be made, for example, by a comparison module (e.g., comparison module 120 of FIG. 1) in conjunction with an output module (e.g., output module 140 of FIG. 1). In various examples, the comparison module can determine the validity of the current mapping by comparing the characters identified by the keystrokes and the current mapping to words included in a dictionary associated with the language of the current mapping.

If the current mapping is not valid, an alternative mapping can be selected at stage 835. The alternative mapping can be selected, for example, by a comparison module (e.g., comparison module 120 of FIG. 1). In various implementations, the alternative mapping can include any mappings previously used by the user associated with the input. In other implementation, the alternative mapping can include any mappings available, for example, to an input method editor or operating system.

At stage 840, a plurality of alternative characters are identified. The plurality of alternative characters can be identified, for example, by a comparison module (e.g., comparison module 120 of FIG. 1). In various implementations, the alternative characters can be derived based upon the alternative mapping(s) selected at stage 835.

At stage 845, the alternative characters are compared to alternative words. The alternative characters can be compared to alternative words, for example, by a comparison module (comparison module 120 of FIG. 1) in conjunction with a dictionary (e.g., dictionary 130 of FIG. 1). In various implementations, the alternative words can be provided, for example, by an alternative dictionary associated with the alternative mapping. The alternative dictionary can be provided by any of a third party service, a learned dictionary, or combinations thereof. Other alternative dictionaries can also be used.

At stage 850, alternative candidate words are identified. The alternative candidate words can be identified, for example, by a comparison module (e.g., comparison module 120 of FIG. 1). In various implementations, the alternative candidate words can be identified based upon finding a threshold match between the alternative candidate words and the alternative characters identified by the alternative mappings. In some implementations the alternative candidate words can be ranked according to frequency of use, relevancy, or combinations thereof. Other rankings, and combinations thereof, can also be used.

Figure 9:
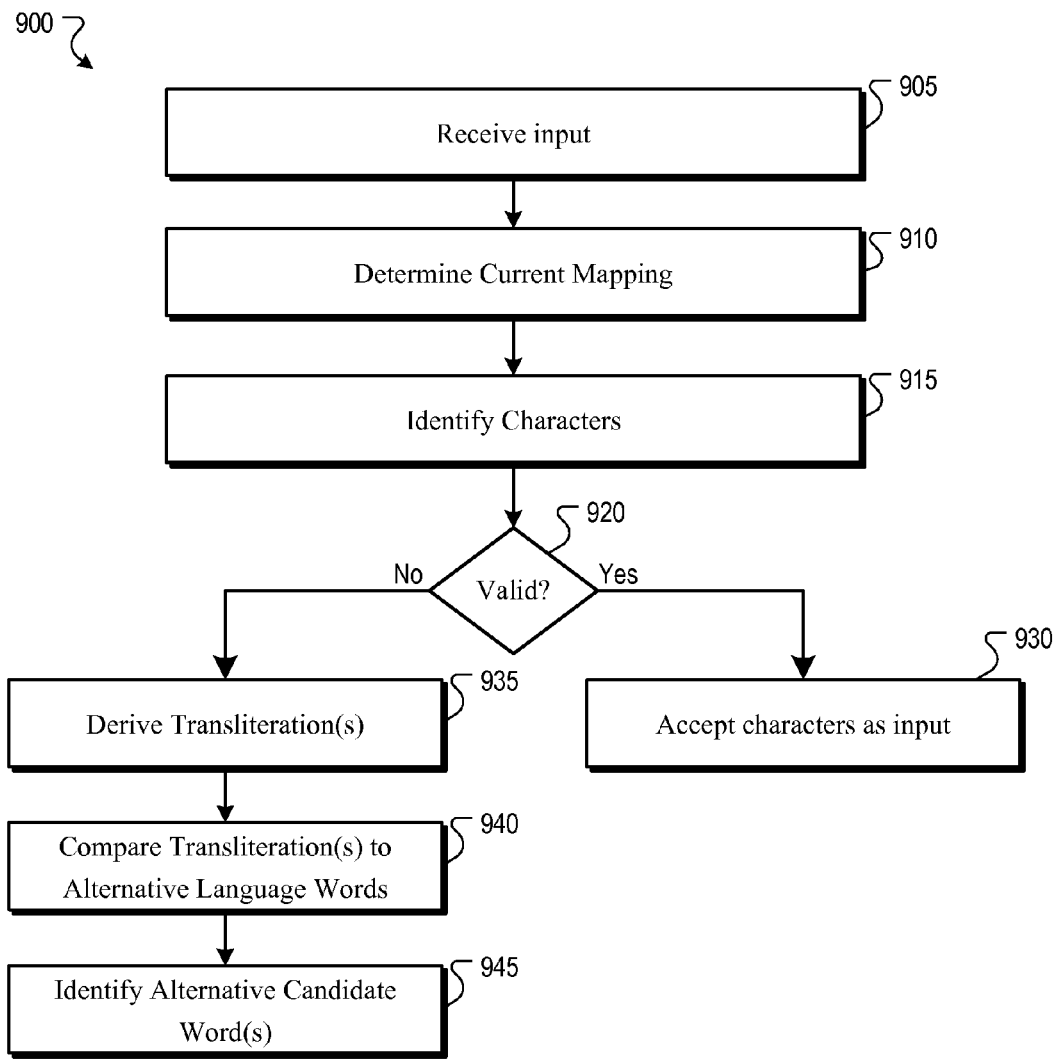
FIG. 9 is a flowchart illustrating another example method of correcting an input Like reference numbers and designations in the various drawings indicate like elements.

FIG. 9 is a flowchart illustrating another example method 900 of correcting an input. At stage 905, input can be received. The input can be received, for example, by an input module (e.g., input module 510 of FIG. 5). In various implementations, the input can be received from an input device such as a keyboard.

At stage 910, a current mapping is determined. The current mapping can be determined, for example, by an input module (e.g., input module 510 of FIG. 5). In various implementations, the current mapping can be identified, for example, by an input method editor (IME) or an operating system, or the keyboard itself. In various implementations, the current mapping can take a particular keystroke and map that keystroke to a particular character (e.g., in accordance with a Unicode standard).

At stage 915, characters are identified. The characters can be identified, for example, by an input module (e.g., input module 510 of FIG. 5). In various implementations, the characters can be identified by mapping received input (e.g., keystroke data) to a character based upon the current mapping.

At stage 920, a determination made whether the current mapping is valid. The determination of whether a current mapping is valid can be made, for example, by a comparison module (e.g., comparison module 520 of FIG. 5) in conjunction with a current dictionary (e.g., current dictionary 530 of FIG. 5) and an output module (e.g., output module 540 of FIG. 5). In various examples, the comparison module can determine the validity of the current mapping by comparing the characters identified by the keystrokes and the current mapping to words included in a dictionary associated with the language of the current mapping.

If the current mapping is not valid, a transliteration can be derived at stage 935. The transliteration can be derived, for example, by a transliteration module (e.g., transliteration module 550 of FIG. 5). In various implementations, the transliteration can be based upon the current mapping of keystroke data to characters in a foreign language. For example, if the user entered "Yerushalaim" the transliteration could be based on transliteration mapping associated with the letters included in the word "Yerushalaim."

At stage 940, the transliteration is compared to alternative language words. The transliteration can be compared to the alternative language words, for example, by a transliteration module (e.g., transliteration module 550 of FIG. 1) in conjunction with an alternative dictionary (e.g., alternative dictionary 560 of FIG. 5). In various implementations, the alternative dictionary can include transliterations associated with a plurality of words included in the alternative dictionary.

At stage 945, alternative candidate words are identified. The alternative candidate words can be identified, for example, by a transliteration module (e.g., transliteration module 550 of FIG. 5). In various implementations, the alternative candidate words can be identified based upon finding a threshold match between the transliteration of the characters and words included in an alternative dictionary. In some implementations the alternative candidate words can be ranked according to frequency of use, relevancy (e.g., percentage match or confidence), or combinations thereof. Other rankings, and combinations thereof, can also be used. In various implementations, an alternative candidate word can be used as input to a search engine to perform a search of internet documents with relevance to the alternative candidate word.

In other implementations, the transliteration module 550 of FIG. 5 can be combined with the comparison module 110 of FIG. 1 into a single system, thereby allowing for hybrid entry of keystrokes data. For example, if the keystroke data were associated with a search query, the user might enter part of the query to be matched using the alternative mapping of the keystroke data, and part of the query can be entered to be matched using transliteration of the keystroke data. Alternatively, the systems of FIGS. 1 and 5 can be combined and perform parallel processing on the keystroke data, and the corresponding candidate words can be combined, ranked and presented to the user based on the rank.

In various examples, the input can be a search query to be used as input for a search engine. In such examples, the search query is typically a phrase (e.g., more than one word). In those examples where the input includes a phrase, several alternative candidate phrases can be generated by applying a transposer (e.g., the comparison module 120 of FIG. 1) and/or the transliteration module to the various words in the phrase. The various words in the phrase can also be submitted to a context spelling corrector module operable to interpret the phrase and determine if a spell corrected version of the phrase in the same language would better match the input. Each of the transposer, transliteration module and the spell corrector module can produce scores for alternative candidate phrases. Given the scores, the alternative candidate phrase with the best score can be selected.

In some implementations, the scores of different phrases can be downgraded by a selected value before the comparison of the scores. The selected value for the downgrade can be determined, for example, by the number of segments in the phrase which have passed through the IME transposer or the transliteration engine. A score downgrade can reflect the approximate unlikelihood that a user would enter a heavily mixed query.

In various implementations, alternative candidate phrases can be identified by enumerating for each word in the original phrase on all four possible modes: 1) leaving the word unchanged; 2) applying a transposer; 3) applying a transliteration module; 4) applying a transposer followed by a transliteration module.

In other implementations, alternative candidate phrases can be identified by scoring the original phrase, a transposition of the original phrase, a transliteration of the original phrase, and a transposition of the entire phrase followed by a transliterating the entire phrase. In additional implementations, a partial list of phrases can be identified based upon applying a transposer or a transliteration module on a subset of the original phrase. In those implementations, where a partial list of phrases is identified, the partial list of phrases is constructed by: identifying a transposition of each word in the original phrase, a transliteration of each word in the original phrase, and a transliteration of the transposition of each word in the original phrase. A word scorer can be applied for the various transformations of the word, including applying the word scorer to the original word a it appeared in the original phrase. Then, a number of phrases with best aggregated scores can be chosen. Thus, for each candidate phrase we sum up the scores associated with the individual words included in the original phrase or alternative candidate words and select the phrase with the best score to use as a search query for a search engine.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal, that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer implemented method comprising:
   receiving keystroke data from a keyboard input device;
   determining a current mapping for the keyboard input device in response to a language for the keyboard input device;
   identifying characters responsive to the keystroke data and the current mapping;
   comparing the characters to words in a dictionary associated with the current mapping, wherein the dictionary stores words in the language;
   determining whether the characters identify a word in the language based on the comparison;
   if a word in the language is identified by the characters, accepting the characters as input; and
   if no word in the language is identified by the characters:
      selecting an alternative mapping for the keyboard input device, wherein the alternative mapping is associated with an alternative language;
      determining alternative characters based on the keystroke data and the alternative mapping;
      comparing the alternative characters to alternative words in an alternative dictionary associated with the alternative mapping, wherein the alternative dictionary stores words in the alternative language; and
      determining that the alternative mapping is valid if the alternative characters match an alternative word in the alternative dictionary.

2. The computer implemented method of claim 1, further comprising:
   wherein if the alternative characters do not match any alternative word in the alternative dictionary:
   identifying one or more candidate words based on partial matches of the alternative characters to the alternative words;
   ranking the identified candidate words at least in part based on respective frequencies of usage of the identified candidate words in a language model of the alternative language; and
   providing the one or more identified candidate words for display on a user device at least in part based on the ranking.

3. The computer implemented method of claim 2, wherein the candidate words are ranked at least in part based on an edit distance of the candidate word to the alternative input characters.

4. The computer implemented method of claim 2, wherein the candidate word is ranked at least in part based on a frequency of usage of the candidate word comprising a frequency with which the candidate word occurs in query logs.

5. The computer implemented method of claim 2, wherein the candidate words are ranked at least in part based on a frequency of usage of the candidate word comprising a frequency with which the candidate word is used in a language model.

6. The computer implemented method of claim 1, further comprising:

wherein if the alternative characters do not match any alternative word in the alternative dictionary:
identifying one or more candidate words based on partial matches of the alternative characters to the alternative words;
ranking the identified candidate words at least in part based on respective frequencies of usage of the identified candidate words in a language model of the alternative language; and
providing the one or more identified candidate words to a search engine interface at least in part based on the ranking.

7. The computer implemented method of claim 1, further comprising:
entering the word or the alternative word into a search query; and
performing a search of internet documents based on the search query.

8. The computer implemented method of claim 1, wherein determining a current mapping for the keyboard input device comprises retrieving the language from web browser preferences or browser cookies, an input method editor (IME), an operating system, or the keyboard input device.

9. The computer implemented method of claim 1, wherein determining a current mapping for the keyboard input device is at least in part based on
a language corresponding to a geolocation of the keyboard input device.

10. The computer implemented method of claim 1, further comprising deriving the alternative mappings and the alternative dictionary from browser settings, operating system settings, or browser cookies.

11. A computer implemented method comprising:
receiving keystroke data for a keyboard input device;
determining a current mapping for the keyboard input device that is associated with a language;
determining characters based on the keystroke data and the current mapping;
comparing the characters to words in a dictionary associated with the language, wherein the dictionary stores words in the language;
determining whether the characters identify a word in the language based on the comparison;
if the characters are determined to not identify a word in the language:
selecting an alternative mapping for the keyboard input device, wherein the alternative mapping is associated with an alternative language;
determining alternative characters based on the keystroke data and the alternative mapping;
comparing the alternative characters to alternative words in an alternative dictionary associated with the alternative language wherein the alternative dictionary stores words in the alternative language; and
identifying one or more alternative words based on the comparison of the alternative characters and the alternative words in the alternative language.

12. The computer implemented method of claim 11, wherein determining a current mapping for the keyboard input device comprises
retrieving the language from web browser preferences or cookies, an input method editor (IME), an operating system, or the keyboard input device.

13. The computer implemented method of claim 11, wherein determining a current mapping for the keyboard input device is at least in part based on
a language corresponding to a geolocation of the keyboard input device.

14. The computer implemented method of claim 11, further comprising deriving the alternative mapping, the alternative language and the alternative dictionary from browser settings, operating system settings, browser cookies, or user history.

15. Software stored in one or more computer readable media and comprising instruction executable by a processing system, and upon such execution causing the processing system to perform operations comprising:
receiving a plurality of keystrokes associated with a keyboard input device;
identifying a plurality of characters based on the plurality of keystrokes and a current language associated with the keyboard input device;
comparing the plurality of characters to a plurality of words from a current dictionary associated with the current language;
determining whether the plurality of characters identifies a word in the current dictionary at least on part based on whether an edit distance between the plurality of characters and a word from the plurality of words in the current dictionary is above a threshold edit distance;
if the plurality of characters does not identify a word in the current dictionary:
identifying a plurality of alternative characters using an alternative mapping of the keyboard input device in one or more alternative languages;
comparing the plurality of alternative characters to a plurality of alternative words from an alternative dictionary associated with the one or more alternative languages;
identifying one or more candidate alternative words at least in part based on an edit distance between the plurality of alternative characters and the plurality of alternative words from an alternative dictionary associated with the one or more alternative language.

16. The software of claim 15, the instructions further operable to cause the processing system to perform a further operation comprising
providing the one or more candidate alternative words to a user device.

17. The software of claim 16, the instructions further operable to cause the processing system to perform a further operation comprising
providing the one or more candidate alternative words in a list ordered from most frequently used alternative words to least frequently used alternative words.

18. The software of claim 16, the instructions further operable to cause the processing system to perform a further operation comprising
providing the one or more candidate alternative words in a list ordered by an edit distance between the alternative characters and the one or more candidate alternative words.

19. The software of claim 15, the instructions further operable to cause the processing system to perform a further operation comprising
providing the one or more candidate alternative words to a search engine interface.

20. A system comprising:
an input module operable to receive keystroke data from a keyboard input device and to map the keystroke data to characters based on a current mapping associated with the keyboard input device;

a comparison module operable to:
- compare the characters to words identified by a dictionary associated with the current mapping, wherein the dictionary stores words in a current language associated with the current mapping,
- accept the characters based on identifying a threshold match between the characters and a word from the current dictionary;
- derive alternative characters based on the keystroke data and an alternative mapping when a threshold match between the characters and a word from the current dictionary is not identified; and
- compare the alternative characters to alternative words from an alternative dictionary associated with an alternative language to identify an alternative candidate word, wherein the alternative dictionary stores the alternative words in the alternative language; and an output module operable to provide the word or the alternative candidate word to a user.

21. The system of claim 20, wherein the input module is further operable to identify the current mapping for the keyboard input device from the language of web browser preferences or cookies, an input method editor (IME), an operating system, or the keyboard input device.

22. The system of claim 20, wherein the input module is further operable to
- identify the current mapping for the keyboard input device through identification of a local language corresponding to a geolocation of the keyboard input device and
- identify the current mapping related to the local language.

23. The system of claim 20, wherein the comparison module is operable to
- select alternative mappings, alternative languages and alternative dictionaries responsive to browser settings, operating system settings, browser cookies, or user history.

* * * * *

UNITED STATES PATENT AND TRADEMARK OFFICE
CERTIFICATE OF CORRECTION

| | |
|---|---|
| PATENT NO. | : 8,229,732 B2 |
| APPLICATION NO. | : 12/201895 |
| DATED | : July 24, 2012 |
| INVENTOR(S) | : Ivan D. Davtchev et al. |

It is certified that error appears in the above-identified patent and that said Letters Patent is hereby corrected as shown below:

Claim 10, Column 15, Line 31 – delete "mappings" and insert -- mapping --, therefor.

Signed and Sealed this
Twenty-fifth Day of September, 2012

David J. Kappos
*Director of the United States Patent and Trademark Office*